United States Patent [19]

Orikasa et al.

[11] Patent Number: 5,179,160

[45] Date of Patent: * Jan. 12, 1993

[54] THERMOPLASTIC RESIN COMPOSITION AND METHOD FOR PREPARING THE SAME

[75] Inventors: Yuichi Orikasa, Yokohama; Suehiro Sakazume, Fujisawa, both of Japan

[73] Assignees: Nippon Petrochemicals Co., Ltd.; Nippon Oil & Fats Co., Ltd., both of Japan

[*] Notice: The portion of the term of this patent subsequent to Jan. 8, 2008 has been disclaimed.

[21] Appl. No.: 233,150

[22] Filed: Aug. 17, 1988

[30] Foreign Application Priority Data

Aug. 17, 1987 [JP] Japan ............................ 62-203750
Oct. 2, 1987 [JP] Japan ............................ 62-250173

[51] Int. Cl.$^5$ .................... C08L 51/06; C08L 77/06
[52] U.S. Cl. ........................ 525/66; 524/115; 524/445; 525/286; 525/298; 525/301; 525/302; 525/312; 525/324
[58] Field of Search .......................................... 525/66

[56] References Cited

U.S. PATENT DOCUMENTS 4,983,663  1/1991  Orikasa et al. .................. 525/66

FOREIGN PATENT DOCUMENTS 206644   12/1985  European Pat. Off. .
216347    4/1987  European Pat. Off. .
2311814  12/1976  France .
1552352   9/1979  United Kingdom .

Primary Examiner—Jacob Ziegler
Attorney, Agent, or Firm—Ostrolenk, Faber, Gerb & Soffen

[57] ABSTRACT

There is here provided a thermoplastic resin composition which comprises (I) 50 to 99% by weight of a polyamide resin, and (II) 50 to 1% by weight of a multiphase structure thermoplastic resin which is composed of 5 to 95% by weight of at least one ethylene copolymer selected from the group consisting of epoxy group-containing ethylene copolymers, ethylene-unsaturated carboxylic acids, alkyl ester copolymers and metallic salts of the ethylene-unsaturated carboxylic acids, and ethylene-vinyl ester copolymers, and 95 to 5% by weight of a vinyl polymer or copolymer obtained from at least one vinyl monomer, either of both the components possessing a dispersion phase where each particle has a diameter of 0.001 to 10 μm. A method for preparing the above-mentioned thermoplastic resin composition is also provided here.

4 Claims, 2 Drawing Sheets

E-GMA-g-PMMA  ⟷ 1μm

E-GMA-MMA  ⟷ 1μm

E-GMA/PMMA  ⟵⟶ 1μm

E-GMA-g-MMA  ⟵⟶ 1μm

THERMOPLASTIC RESIN COMPOSITION AND METHOD FOR PREPARING THE SAME

BACKGROUND OF THE INVENTION (1) Field of the Invention

The present invention relates to a thermoplastic resin composition in which excellent mechanical toughness, durability and solvent resistance of polyamide resins are still kept up and in which hygroscopicity, moldability and impact resistance are improved, and it relates to a method for preparing the resin composition. This composition of the present case can be widely utilized as materials for electrical and electronic machine parts, automobile parts and the like.

(2) Description of the Prior Art

In recent years, polyamide resins are getting important more and more in the industrial field. With regard to the polyamide resins, thermal stability is extremely excellent, hardness is very high, and heat resistance is also good, but impact resistance is low and hygroscopicity is high. Therefore, applications of the polyamide resins are now limited inconveniently.

As technical means for improving the impact resistance of the polyamide resins, it is already known to use a reactive group-containing polyolefin elastomer such as a maleic anhydride-modified polyolefin elastomer or an epoxy group-containing polyolefin elastomer as an impact resistance improver.

For the purpose of improving the hygroscopicity of the polyamide resins, there have been also suggested a method of melting and mixing polystyrene or styrene-acrylonitrile copolymer (Japanese Patent Publication No. 40-7380), a method of melting and mixing an $\alpha,\beta$-unsaturated dicarboxylic anhydride or an epoxy group-containing polystyrene (Japanese Patent Unexamined Publication No. 60-86162), a method of mixing a glass fiber and a thermoplastic resin (Japanese Patent Publication No. 48-13944, and GB Patent Nos. 1,241,361 and 1,552,352), and other methods.

However, the above reactive group-containing polyolefin elastomer as the impact resistance improver is a substantially rubbery polymer for its use purpose and has a glass transition temperature of room temperature or less. Therefore, in order to heighten the impact resistance, it is conceived to increase the amount of the reactive group-containing polyolefin elastomer, but if the content of the latter is merely increased, important characteristics of the polyamide resins, for example, tensile strength, surface hardness and thermal deformation resistance, i.e., thermal dimensional stability deteriorate disadvantageously.

With regard to the method of melting and mixing polystyrene or styrene-acrylonitrile copolymer in order to improve the hygroscopicity of the polyamide resins, articles produced thereby have a tendency to peel off in the form of layers because of the poor compatibility of vinyl copolymer to the polyamide resin, so that mechanical strength degrades noticeably. For this reason, it is known that this method cannot provide good molding materials.

As for the method of mixing a glass fiber and a thermoplastic resin with a polyamide resin, the hygroscopicity is effectively lowered, but molding devices such as the screw of an extruder, a mold and the like are liable to wear away. In addition, secondary treatments such as ion plating, sputtering, coating and the like are difficult, and fluidity is also poor inconveniently.

In the method of melting and mixing an $\alpha,\beta$-unsaturated dicarboxylic anhydride or an epoxy group-containing polystyrene, its compatibility with the polyamide resin is improved by the reaction between its reactive group and the residual reactive group of the polyamide resin, and in consequence, the improvement in hygroscopicity is also confirmed. However, this method has the drawback that the impact resistance deteriorates.

The inventors of the present application have intensively researched to solve the conventional disadvantages, i.e., to improve impact resistance and hygroscopicity/while simultaneously maintaining mechanical and thermal characteristics of the polyamide resins. As a result, it has been found that a thermoplastic resin composition obtained by blending a specific multi-phase structure thermoplastic resin with the polyamide resin improves the impact resistance and hygroscopicity simultaneously, keeping up the mechanical and thermal properties, and that in manufacturing the above-mentioned composition, the above melting and kneading operations should be at a specific optimum temperature. On the basis of these findings, the present invention has been completed.

SUMMARY OF THE INVENTION

The first aspect of the present invention is directed to a thermoplastic resin composition containing (I) 50 to 99% by weight of a polyamide resin, and (II) 50 to 1% by weight of a multi-phase structure thermoplastic resin which is composed of 5 to 95% by weight of at least one ethylene copolymer selected from the group consisting of epoxy group-containing ethylene copolymers, ethylene-unsaturated carboxylic acids, alkyl ester copolymers and metallic salts of the ethylene-unsaturated carboxylic acids, and ethylene-vinyl ester copolymers, and 95 to 5% by weight of a vinyl polymer or copolymer obtained from at least one vinyl monomer, either of both the components being formed with a dispersion phase having a particle diameter of 0.001 to 10 $\mu$m.

The second aspect of the present invention is directed to a method for preparing a thermoplastic resin composition which comprises the step of melting and mixing a polyamide resin (I) with 1 to 100% by weight of a graft polymerization precursor (A) which is obtained by first adding at least one vinyl monomer, at least one radical polymerizable or copolymerizable organic peroxide and a radical polymerization initiator to an aqueous suspension of at least one ethylene copolymer selected from the group consisting of epoxy group-containing ethylene copolymers, ethylene-unsaturated carboxylic acids, alkyl ester copolymers and metallic salts of the ethylene-unsaturated carboxylic acids, and ethylene-vinyl ester copolymers, then heating the suspension under such conditions that the decomposition of the radical polymerization initiator does not occur substantially, in order to impregnate the ethylene copolymer with the vinyl monomer, the radical polymerizable or copolymerizable organic peroxide and the radical polymerization initiator, and raising the temperature of this aqueous suspension, when the degree of the impregnation has reached 50% by weight of the original weight of the vinyl monomer, peroxide and initiator, in order to copolymerize the vinyl monomer with the radical polymerizable or copolymerizable organic peroxide in the ethylene copolymer, 0 to 99% by weight of at least one ethylene copolymer (B) selected from the group consisting of epoxy group-containing ethylene copolymers, ethylene-unsaturated carboxylic acids, alkyl ester copolymers and metallic salts of the ethylene-unsaturated carboxylic acids, and ethylene-vinyl ester copolymers, and 0 to 99% by weight of a vinyl polymer or copolymer (C) obtained by polymerizing at least one vinyl monomer, or alternatively melting and mixing the components (A), (B) and (C) previously at a temperature in the range of 100° to 300° C., and then melting and mixing the resulting mixture with the aromatic polyester resin (I).

DETAILED DESCRIPTION OF THE INVENTION

Figure 1:
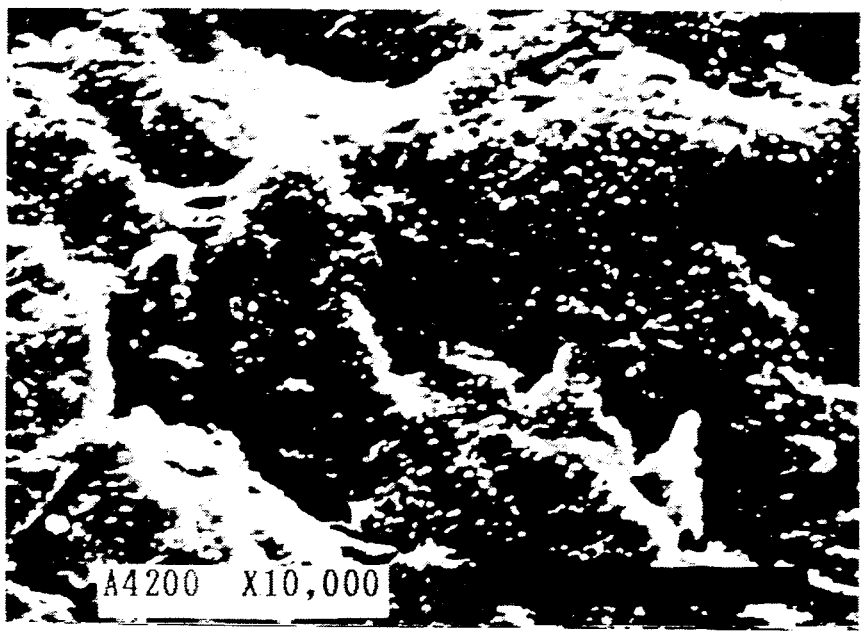
FIG. 1 is the electron microscope photograph of a multi-phase structure thermoplastic resin prepared in Preparation Example 2 in which spherical methyl methacrylate polymer particles having a diameter of 0.1 to 0.2 μm are dispersed in a base polymer matrix comprising ethylene-glycidyl methacrylate copolymer (E-GMA). This photograph is indicated with E-GMA-g-PMMA (multi-phase structure thermoplastic resin).
Figure 2:
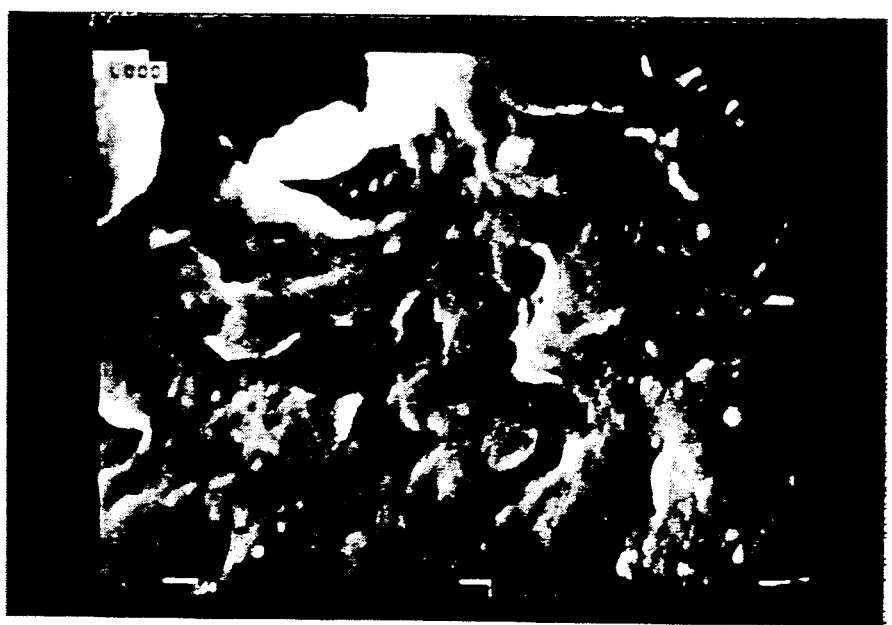
FIG. 2 is the electron microscope photograph of a random terpolymer (Reference Example 1) of an ethylene-glycidyl methacrylate (GMA)-methyl methacrylate prepared by high-pressure radical polymerization. This photograph is indicated with E-GMA-MMA (random terpolymer).
Figure 3:
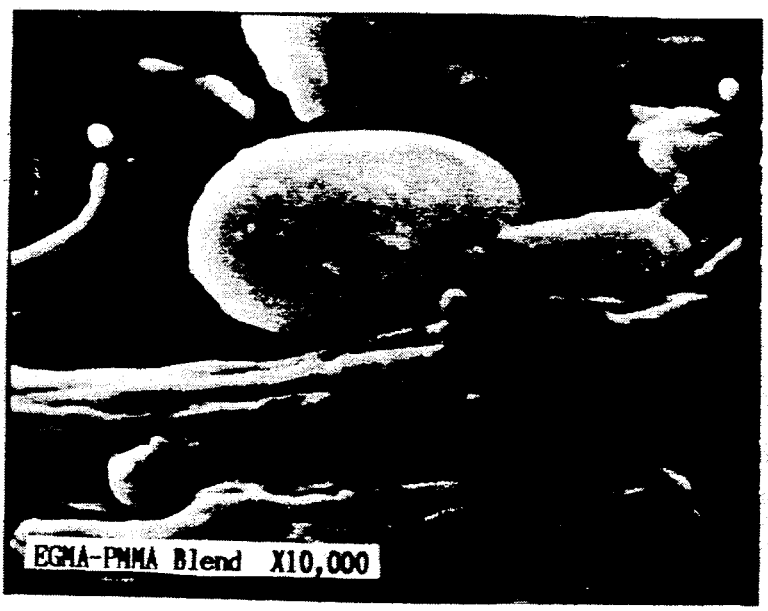
FIG. 3 is the electron microscope photograph of a blend composition (Reference Example 2) which is prepared by first blending E-GMA used in Preparation Example 1 with 30% by weight of polymethyl methacrylate (PMMA) and then mixing them under melting. This photograph is indicated with E-GMA/PMMA (blend polymer).
Figure 4:
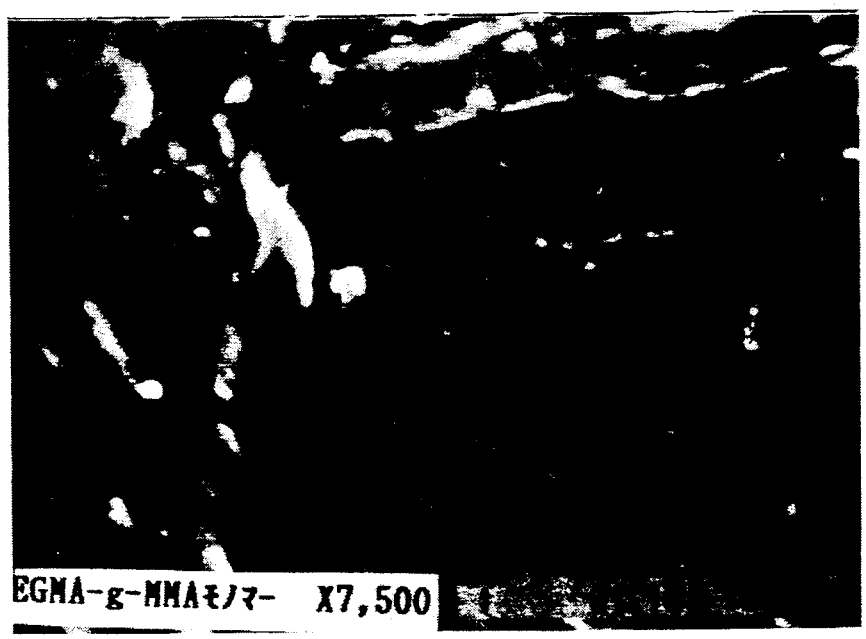
FIG. 4 is the electron microscope photograph of a short-chain graft polymer prepared by reacting E-GMA copolymer used in Preparation Example 1 with methyl methacrylate in a usual grafting manner. This Figure is indicated with E-GMA-g-MMA (short-chain graft polymer).

Examples of polyamide resin used in the present invention include aliphatic polyamide resins such as 6-nylon, 6,6-nylon, 6,10-nylon, 6,12-nylon, 11-nylon, 12-nylon and 4,6-nylon; aromatic polyamide resins such as polyhexamethylenediamine terephthalamide, polyhexamethylenediamine isophthalamide and xylene group-containing polyamide; modified compounds thereof; and mixtures thereof. The particularly preferable polyamide resins are 6-nylon and 6,6-nylon.

The ethylene copolymer used in the multi-phase structure thermoplastic resin regarding the present invention is at least one ethylene copolymer selected from the group consisting of epoxy group-containing ethylene copolymers, ethylene-unsaturated carboxylic acids, alkyl ester copolymers and metallic salts of the ethylene-unsaturated carboxylic acids, and ethylene-vinyl ester copolymers. The ethylene copolymer may be preferably prepared by a high-pressure radical polymerization.

The above-mentioned epoxy group-containing ethylene copolymer is a copolymer of ethylene and an unsaturated glycidyl group-containing monomer, or a terpolymer of ethylene, an unsaturated glycidyl group-containing monomer and another unsaturated monomer.

Examples of the unsaturated glycidyl group-containing monomer include glycidyl acrylate; glycidyl methacrylate; itaconic acid monoglycidyl ester; butenetricarboxylic acid monoglycidyl ester; butenetricarboxylic acid diglycidyl ester; butenetricarboxylic acid triglycidyl ester; vinyl-glycidyl ethers and glycidyl esters of maleic acid, crotonic acid and fumaric acid; allyl glycidyl ether; glycidyloxy ethylvinyl ether; glycidyl ethers such as styrene p-glycidyl ether; and p-glycidyl styrene. The particularly preferable ones are glycidyl methacrylate and acrylic glycidyl ether.

Other examples of the unsaturated monomers include the undermentioned unsaturated carboxylic acid alkyl esters and vinyl esters, and olefins. Typical examples of the olefins include propylene, butene-1, hexene-1, decene-1, octene-1 and styrene.

Furthermore, examples of alkyl ester monomers and vinyl ester monomers for ethylene-unsaturated carboxylic acids, their alkyl ester copolymers and ethylene-vinyl ester copolymers include unsaturated carboxylic acids such as acrylic acid, methacrylic acid, maleic acid, fumaric acid, maleic anhydride and itaconic anhydride; unsaturated carboxylic acid alkyl ester monomers such as methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, monomethyl maleate, monoethyl maleate, diethyl maleate and monomethyl fumarate; and vinyl ester monomers such as vinyl propyonate, vinyl acetate, vinyl caproate, vinyl caprylate, vinyl laurate, vinyl stearate and vinyl trifluoroacetate. Particularly preferable ones are ethyl acrylate and vinyl acetate. These monomers may be used in the form of a mixture thereof.

Moreover, in the present invention, the ethylene polymers include copolymers prepared by additionally modifying low-, medium- and high-density polyethylenes and ethylene-α-olefin copolymers with the above-mentioned unsaturated carboxylic acids such as acrylic acid, maleic acid and maleic anhydride, and ion-cross-linked ethylene copolymers prepared by reacting the above-mentioned random or grafted copolymers with monovalent, divalent and trivalent metallic compounds of the groups I, II, III, IV-A and VI of the periodic table.

Examples which are desirable as the above-mentioned metallic compounds are nitrates, acetates, oxides, hydroxides, methoxides, ethoxides, carbonates and bicarbonates of the above metals.

Examples of the metallic ions include $K^+$, $Na^+$, $Ca^{++}$, $Mg^{++}$, $Zn^{++}$, $Ba^{++}$, $Fe^{++}$, $Fe^{+++}$, $Co^{++}$, $Ni^{++}$ and $Al^{+++}$. Of these metallic ions, $Na^+$, $Mg^{++}$ and $Zn^{++}$ are particularly preferred. These various metallic compounds can be used in an optional combination thereof.

Typical examples of the epoxy group-containing ethylene copolymer include ethylene-glycidyl methacrylate copolymer; ethylene-vinyl acetate-glycidyl methacrylate copolymer; ethylene-ethyl acrylate-glycidyl methacrylate copolymer; ethylene-carbon monoxideglycidyl methacrylate copolymer; ethylene-glycidyl acrylate copolymer; and ethylene-vinyl acetate-glycidyl acrylate copolymer. Above all, ethylene-glycidyl methacrylate copolymer is preferred.

In addition, other examples of the epoxy group-containing ethylene copolymers include modified compounds prepared by subjecting undermentioned ethylene homopolymers or copolymers and the above-mentioned unsaturated glycidyl group-containing monomers to addition reaction.

Examples of the ethylene homopolymers and copolymers which perform the addition reaction with the above-mentioned unsaturated glycidyl group-containing monomers include low-density, medium-density and high-density polyethylenes; ethylene-propylene copolymer; ethylene-butene-1 copolymer; ethylene-hexene-1 copolymer; ethylene-4-methylpentene-1 copolymer; copolymers with other olefins mainly comprising ethylene such as ethylene-octene-1 copolymer; ethylene-vinyl acetate copolymer; ethylene-acrylic acid copolymer; ethylene-methacrylic acid copolymer; copolymers of ethylene and methyl, ethyl, propyl, isopropyl and butyl acrylate and methacrylate; ethylene-maleic acid copolymer; ethylene-propylene copolymer rubber; ethylene-propylene-diene-copolymer rubber; etylene-vinyl acetate-vinyl chloride copolymer; mixtures thereof; and mixtures of these compounds and other synthetic resins or rubbers.

The above-mentioned ethylene copolymer may be prepared preferably by a high-pressure radical polymerization.

That is, the ethylene copolymer may be prepared by simultaneously or stepwise contacting and polymerizing a monomer mixture of 60 to 99.5% by weight of ethylene, 0.5 to 40% by weight of one or more unsaturated glycidyl group-containing monomer, and 0 to 39.5% by weight of at least one other unsaturated monomer, or a monomer mixture of 50 to 99.5% by weight of ethylene, 50 to 0.5% by weight of at least one monomer selected from the group consisting of unsaturated carboxylic acids, their alkyl esters and/or vinyl esters, and 0 to 49.5% by weight of another unsaturated monomer in the presence of 0.0001 to 1% by weight of a radical polymerization initiator based on the total weight of all the monomers at a polymerization pressure of 500 to 4,000 kg/cm$^2$, preferably 1,000 to 3,500 kg cm$^2$, at a reaction temperature of 50° to 400° C., preferably 100° to 350° C., using a chain transfer agent and, if necessary, some auxiliaries in an autoclave or tubular reactor.

Examples of the above-mentioned radical polymerization initiator include usual initiators such as peroxides, hydroperoxides, azo-compounds, amine oxide compounds and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins; halogen-substituted hydrocarbons such as chloroform and carbon tetrachloride; saturated aliphatic alcohols such as methanol, ethanol, propanol and isopropanol; saturated aliphatic carbonyl compounds having 1 to 20 or more carbon atoms such as carbon dioxide, acetone and methyl ethyl ketone; and aromatic compounds such as toluene, diethylbenzene and xylene.

Typical examples of the vinyl polymer and copolymer in the multi-phase structure thermoplastic resin used in the present invention include polymers and copolymers prepared by polymerizing one or more of vinyl monomers such as vinyl aromatic monomers, for example, styrene, nucleus-substituted styrenes such as methylstyrene, dimethylstyrene, ethylstyrene, isopropylstyrene and chlorostyrene, and α-substituted styrene such as α-methylstyrene and α-ethylstyrene; acrylate and methacrylate monomers, for example, alkyl esters having 1 to 7 carbon atoms of acrylic acid or methacrylic acid such as methyl, ethyl, propyl, isopropyl and butyl acrylate and methacrylate; acrylonitrile and methacrylonitrile monomers; vinyl ester monomers such as vinyl acetate and vinyl propionate; acrylamide and methacrylamide monomers; and monoesters and diesters of maleic anhydride and maleic acid. Above all, the vinyl aromatic monomers are particularly preferable.

The multi-phase structure thermoplastic resin used in the present invention is an ethylene copolymer or a vinyl polymer or copolymer matrix in which another vinyl polymer or copolymer, or ethylene copolymer is uniformly dispersed in a spherical form.

The polymer dispersed in the matrix has a particle diameter of 0.001 to 10 μm, preferably 0.01 to 5 μm. When the particle diameter of the dispersed polymer is less than 0.001 μm or is more than 10 μm, the dispersibility of the polymer is bad in dispersing the latter in the polyamide resin, with the result that, for example, the appearance of articles made therefrom deteriorates or the improvement effect of impact resistance is unpreferably insufficient.

The vinyl polymer or copolymer in the multi-phase thermoplastic resin used in the present invention has a number average polymerization degree of 5 to 10,000, preferably 10 to 5,000.

When the number average polymerization degree is less than 5, heat resistance of the thermoplastic resin composition of the present invention declines unpreferably, though impact resistance can be improved. Inversely, when it is in excess of 10,000, melting viscosity is high, moldability deteriorates, and surface luster falls off unpreferably.

The multi-phase thermoplastic resin used in the present invention comprises 5 to 95% by weight, preferably 20 to 90% by weight, of the ethylene copolymer. Therefore, the content of the vinyl polymer or copolymer is 95 to 5% by weight, preferably 80 to 10% by weight.

When the content of the ethylene copolymer is less than 5% by weight, the compatibility of the ethylene copolymer in the polyamide resin is poor, and inversely when it is in excess of 95% by weight, heat resistance and dimensional stability of the blended product is impaired unpreferably.

As a grafting technique used to prepare the multi-phase structure thermoplastic resin regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

That is, water is suspended in 100 parts by weight of at least one ethylene copolymer selected from the group consisting of epoxy group-containing ethylene copolymers, ethylene-unsaturated carboxylic acids, alkyl ester copolymers and metallic salts of the ethylene-unsaturated carboxylic acid, and ethylene-vinyl ester copolymers. Afterward, 5 to 400 parts by weight of at least one vinyl monomer is added to the suspension, and in the mixture, a solution is poured in which there are dissolved 0.1 to 10 parts by weight, based on 100 parts by weight of the vinyl monomer, of one or a mixture of radical polymerizable or copolymerizable organic peroxides represented by the undermentioned general formula (a) or (b) and 0.01 to 5 parts by weight, based on 100 parts by weight of the total of the vinyl monomer and the radical polymerizable or copolymerizable organic peroxide, of a radical polymerization initiator in which a decomposition temperature to obtain a half-life period of 10 hours is from 40° to 90° C. The mixture is then heated under conditions that the decomposition of the radical polymerization initiator does not occur substantially, in order to impregnate the ethylene copolymer with the vinyl monomer, the radical polymerizable or copolymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the ethylene copolymer, thereby obtaining a graft polymerization precursor (A). This graft polymerization precursor (A) also is the multi-phase structure thermoplastic resin.

Therefore, the thus obtained graft polymerization precursor (A) may be directly melted and mixed with the polyamide resin, but the most preferably multi-phase thermoplastic resin (II) can be obtained by kneading the graft polymerization precursor.

That is, the multi-phase structure thermoplastic resin of the present invention may be obtained by kneading the graft polymerization precursor (A) under melting at 100° to 300° C. Alternatively, the ethylene copolymer (B) or the vinyl polymer or copolymer (C) may be mixed with the graft polymerization precursor, and the mixture may be then kneaded under melting to obtain the multi-phase structure thermoplastic resin.

The above-mentioned radical polymerizable or copolymerizable organic peroxides are compounds represented by the general formulae (a) and (b):

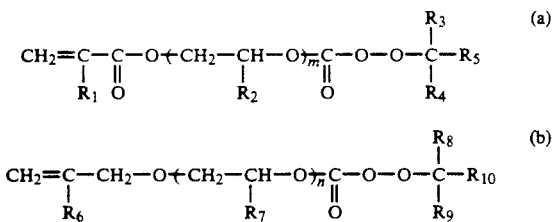

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2.

Typical examples of the radical polymerizable or copolymerizable organic peroxides represented by the general formula (a) include t-butylperoxyacryloyloxyethyl carbonate; t-amylperoxyacryloyloxyethyl carbonate; t-hexylperoxyacryloyloxyethyl carbonate; 1,1,3,3-tetramethylbutylperoxyacryloyloxyethyl carbonate; cumylperoxyacryloyloxyethyl carbonate; p-isopropylperoxyacryloyloxyethyl carbonate; t-butylperoxymethacryloyloxyethyl carbonate; t-amylperoxymethacryloyloxyethyl carbonate; 1,1,3,3-tetramethylbutylperoxymethacryloyloxyethyl carbonate; cumylperoxymethacryloyloxyethyl carbonate; p-isopropylperoxymethacryloyloxyethyl carbonate; t-butylperoxyacryloyloxyethoxyethyl carbonate; t-amylperoxyacryloyloxyethoxyethyl carbonate; t-hexylperoxyacryloyloxyethoxyethyl carbonate; 1,1,3,3-tetramethylbutylperoxyacryloyloxyethoxyethyl carbonate; cumylperoxyacryloyloxyethoxyethyl carbonate; p-isopropylperoxyacryloyloxyethoxyethyl carbonate; t-butylperoxymethacryloyloxyethoxyethyl carbonate; t-amylperoxymethacryloyloxyethoxyethyl carbonate; t-hexylperoxymethacryloyloxyethoxyethyl carbonate; 1,1,3,3-tetramethylbutylperoxymethacryloyloxyethoxyethyl carbonate; cumylperoxymethacryloyloxyethoxyethyl carbonate; p-isopropylperoxymethacryloyloxyethoxyethyl carbonate; t-butylperoxyacryloyloxyisopropyl carbonate; t-amylperoxymacryloyloxyisopropyl carbonate; t-hexylperoxyacryloyloxyisopropyl carbonate; 1,1,3,3-tetramethylbutylperoxyacryloyloxyisopropyl carbonate; cumylperoxyacryloyloxyisopropyl carbonate; p-isopropylperoxyacryloyloxyisopropyl carbonate; t-butylperoxymethacryloyloxyisopropyl carbonate; t-amylperoxymethacryloyloxyisopropyl carbonate; t-hexylperoxymethacryloyloxyisopropyl carbonate; 1,1,3,3-tetramethylbutylperoxymethacryloyloxyisopropyl carbonate; cumylperoxymethacryloyloxyisopropyl carbonate; p-isopropylperoxymethacryloyloxyisopropyl carbonate.

Typical examples of the compounds represented by the general formula (b) include t-butylperoxyallyl carbonate; t-amylperoxyallyl carbonate; t-hexylperoxyallyl carbonate; 1,1,3,3-tetramethylbutylperoxyallyl carbonate; p-menthaneperoxyallyl carbonate; cumylperoxyallyl carbonate; t-butyl-peroxymethallyl carbonate; t-amylperoxymethallyl carbonate; t-hexylperoxymethallyl carbonate; 1,1,3,3-tetramethylbutylperoxymethallyl carbonate; p-menthaneperoxymethallyl carbonate; cumylperoxymethallyl carbonate; t-butylperoxyallyloxyethyl carbonate; t-amylperoxyallyloxyethyl carbonate; t-butylperoxymethallyloxyethyl carbonate; t-amylperoxymethallyloxyethyl carbonate; t-hexylperoxymethallyloxyethyl carbonate; t-butylperoxyallyloxyisopropyl carbonate; t-amylperoxyallyloxyisopropyl carbonate; t-hexylperoxyallyloxyisopropyl carbonate; t-butylperoxymethallyloxyisopropyl carbonate and t-hexylperoxymethallyloxyisopropyl carbonate.

Of these compounds, preferable ones are t-butylperoxyacryloyloxyethyl carbonate; t-butylperoxymethacryloyloxyethyl carbonate; t-butylperoxyallyl carbonate and t-butylperoxymethallyl carbonate.

In the present invention, there is required 50 to 99% by weight, preferably 60 to 95% by weight, of the polyamide resin. Therefore, the multi-phase structure thermoplastic resin is blended therewith in an amount of 50 to 1% by weight, preferably 40 to 5% by weight.

When the content of the polyamide resin is less than 50% by weight, mechanical strength and heat resistance deteriorate unpreferably. Inversely when it is more than 99% by weight, it is impossible to achieve the improvement of impact resistance and hygroscopicity which is the purpose of the present invention.

In the present invention, the inorganic filler (III) can be blended in an amount of 1 to 150 parts by weight based on 100 parts by weight of the resin component containing the above-mentioned components (I)+(II).

The inorganic filler may be used in granular, lamellar, scaly, needle, spherical, balloons and fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates unpreferably.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

Furthermore, in the present invention, the thermoplastic resin composition can be brought into a flame resistant state by blending therewith a flame retardant (IV) in an amount of 5 to 150 parts by weight based on 100 parts by weight of the thermoplastic resin composition (I)+(II).

As the flame retardants, there can be used organic flame retardants of halogen series and phosphorus series, and inorganic flame retardants.

The halogen series flame retardants include brominated and chlorinated paraffins such as tetrabromobisphenol (TBA), hexabromobenzene, decabromodiphenyl ether, tetrabromoethane (TBE), tetrabromobutane (TBB) and hexabromocyclodecane (HBCD), chlorine series flame retardants such as chlorinated polyphenyl, chlorinated polyethylene, chlorinated diphenyl, perchloropentacyclodecane and chlorinated naphthalene, usual halogen series flame retardants such as halogenated diphenyl sulfides, halogenated polystyrenes such as brominated polystyrene, brominated poly-$\alpha$-methylstyrene and derivatives thereof, halogenated polycarbonates such as brominated polycarbonates, halogenated polyesters such as polyalkylene tetrabromoterephthalate and brominated terephthalic acid series polyesters, halogenated epoxy compounds such as halogenated bisphenol series epoxy resins, halogenated polyphenylene oxide compounds such as poly(dibromophenylene oxide), and high-molecular type halogen-containing polymers such as cyanuric acid ester compounds of halogenated bisphenols.

Of these flame retardants, oligomers and polymers of the aromatic halides are particularly preferred.

In addition, phosphorus series flame retardants include phosphates and halogenated phosphates such as tricresyl phosphate, tri($\beta$-chloroethyl) phosphate, tri(dibromopropyl) phosphate and 2,3-dibromopropyl-2,3-chloropropyl phosphate, phosphonic acid compounds and phosphonic acid derivatives.

Examples of other flame retardants include guanidine compounds such as guanidine nitride.

The above-mentioned organic flame retardants may be used alone or as a mixture of two or more thereof.

The organic flame retardant is used in an amount of 5 to 50 parts by weight, preferably 7 to 40 parts by weight based on 100 parts by weight of the thermoplastic resin composition (I)+(II).

When the content of the flame retardant is less than 5 parts by weight, a flame-resistive effect is poor, and when it is more than 50 parts by weight, the flame-resistive effect is not improved any more and cost rises unpreferably.

These organic flame retardants, particularly halogen series flame retardants can exert a synergistic effect, when used together with a flame-resistive auxiliary.

Examples of the flame-resistive auxiliary include antiomony halides such as antimony trioxide, antimony pentaoxide, antimony trichloride and antimony pentaoxide, and antimony compounds such as antimony trisulfide, antimony pentasulfide, sodium antimonate, antimony tartrate and metallic antimony.

In addition, examples of the inorganic flame retardants used in the present invention include aluminum hydroxide, magnesium hydroxide, zirconium hydroxide, basic magnesium carbonate, dolonite, hydrotalcite, calcium hydroxide, barium hydroxide, hydrate of stannous hydroxide, hydrates of inorganic metallic compounds of borax and the like, zinc borate, zinc metaborate, barium metaborate, zinc carbonate, magnesum-calcium carbonate, calcium carbonate, barium carbonate, magnesium oxide, molybdenum oxide, zirconium oxide, stannous oxide and red phosphorus. These inorganic flame retardants may be used alone or as a mixture of two or more thereof. Of these flame retardants, hydrates of metallic compounds of aluminum hydroxide, magnesium hydroxide, zirconium hydroxide, basic magnesium carbonate, dolonite, hydrotalcite are particularly preferable. Above all, aluminum hydroxide and magnesium hydroxide are effective as the flame retartants and are economically advantageous.

The particle diameter of the inorganic flame retardant depends upon its kind, but in the cases of aluminum hydroxide and magnesium hydroxide, the average particle diameter is 20 $\mu$m or less, preferably 10 $\mu$m or less.

The inorganic flame retardant is used in an amount of 30 to 150 parts by weight, preferably 40 to 120 parts by weight based on 100 parts by weight of the thermoplastic resin composition (I)+(II).

When the content of the inorganic flame retardant is less than 30 parts by weight, a flame-resistive effect is poor in its single use, and thus it is necessary to add the organic flame retardant thereto. Inversely, when it is more than 150 parts by weight, impact strength and mechanical strength deteriorate.

In the present invention, the above-mentioned inorganic filler and flame retardant may be employed simultaneously, whereby the content of the flame retardant can be decreased, and other characteristics can be acquired additionally.

In the preparation of the thermoplastic composition of the present invention, melting and mixing are carried out at a temperature of 150° to 350° C., preferably 180° to 320° C. When the above temperature is less than 150° C., the melting is insufficient, melting viscosity is high, the mixing is poor, and the resin tends to peel off in a layer state unpreferably. Inversely when it is in excess of 350° C., decomposition and gelation of the resin take place inconveniently.

In melting and mixing, there may be used a usual kneader such as a Banbury's mixer, a pressure kneader, a kneading extruder, a biaxial extruder and rolls.

In the present invention, there may be additionally used other thermoplastic resins such as polyolefin resins, polyvinyl chloride resin, polyvinylidene chloride resin, polycarbonate resin, polyphenylene ether resin, polyphenylene sulfide resin and polysulfone resin; rubbers such as a natural rubber and a synthetic rubber; and additives such as an antioxidant, an ultraviolet inhibitor, a lubricant, a dispersant, a foaming agent, a crosslinking agent and a colorant.

Now, the present invention will be described in detail in reference to examples.

PREPARATION EXAMPLE 1

Preparation of Multi-phase Structure Thermoplastic Resin IIa

In a 5-liter stainless steel autoclave was placed 2,500 g of pure water, and 2.5 g of polyvinyl alcohol was dissolved therein as a suspending agent. In the solution was placed 700 g of ethylene-glycidyl methacrylate copolymer as an epoxy group-containing olefin copolymer (the content of glycidyl methacrylate=15% by weight)(trade name Rexpearl J-3700; made by Nippon Petrochemicals Co., Ltd.), followed by stirring to suspend the copolymer therein. Separately, in 300 g of styrene as a vinyl monomer were dissolved 1.5 g of benzoylperoxide as a radical polymerization initiator (trade name Nyper-B; made by Nippon Oils & Fats Co., Ltd.) and 6 g of t-butylperoxymethacryloyloxyethyl carbonate as a radical polymerizable or copolymerizable organic peroxide, and the resulting solution was then placed in the above-mentioned autoclave, followed by stirring.

Afterward, the autoclave was heated up to a temperature of 60° to 65° C., and stirring was then continued for 2 hours, so that the epoxy group-containing ethylene copolymer was impregnated with the vinyl monomer containing the radical polymerization initiator and the radical polymerizable or copolymerizable organic peroxide. After it had been confirmed that the total amount of the impregnated vinyl monomer, radical polymerizable or copolymerizable organic peroxide and radical polymerization initiator was 50% by weight or more of the original total weight thereof, the temperature of the mixture was raised to a level of 80° to 85° C., and this temperature was then maintained for 7 hours to complete polymerization, followed by water washing and drying, thereby obtaining a graft polymerization precursor. The styrene polymer was extracted from this graft polymerization precursor with ethyl acetate, and according to measurement by the use of GPC, the number average polymerization degree of the styrene polymer was 900.

Next, this graft polymerization precursor was extruded at 200° C. by a plastomill monoaxial extruder (Toyo Seiki Seisaku-sho Ltd.) to perform graft reaction, whereby a multi-phase structure thermoplastic resin IIa.

This multi-phase structure thermoplastic resin was then observed by a scanning type electron microscope (trade name JEOL JSM T300; made by JEOL, Ltd.), and it was found that it was a multi-phase structure thermoplastic resin in which spherical resin particles each having a diameter of 0.3 to 0.4 μm were uniformly dispersed.

In this case, the grafting efficiency of the styrene polymer was 77.1% by weight.

PREPARATION EXAMPLE 2

Preparation of Multi-phase Structure Thermoplastic Resin IIb

The same procedure as in Preparation Example 1 was repeated with the exception that 300 g of the styrene monomer as a vinyl monomer was replaced with a methyl methacrylate monomer and 0.6 g of n-dodecylmercaptan as a molecular weight modifier was used, thereby preparing multi-phase structure thermoplastic resin IIb.

In this case, the number average polymerization degree of the prepared styrene polymer was 700, and the average diameter of the resin particles dispersed in this resin composition was from 0.1 to 0.2 μm, as shown in Photograph No. 1 (E-GMA-g-PMMA)

PREPARATION EXAMPLE 3

The same procedure as in Preparation Example 1 was repeated with the exception that 300 g of styrene as a vinyl monomer was dissolved in 300 g of benzene as a solvent and that 2.5 g of n-dodecylmercaptan was used as a molecular weight modifier, in order to obtain a graft polymerization precursor, and a graft reaction was brought to an end. In this case, the number average polymerization degree of the styrene polymer was 4.1. This grafted compound was observed by an electron microscope, and it was found that the diameter of the dispersed resin particles seemed to be 0.001 μm or less, but this was not confirmed.

REFERENCE EXAMPLE 1

Preparation of Random Copolymer

In a 3.8-liter reactor equipped with a stirrer were placed a mixture of 1,600 g of ethylene, 32 g of glycidyl methacrylate and 40 g of methyl methacrylate, and in the presence of 200 g of n-hexane as a chain transfer agent and 0.0012% by weight of a radical polymerization initiator (di-tert-butyl peroxide) based on the total weight of the mixture, reaction was then performed at a polymerization pressure of 1,600 kg/cm$^2$ at a reaction temperature of 170° C., thereby obtaining ethylene-glycidyl methacrylate-methyl methacrylate random terpolymer. Photograph No. 2 (E-GMA-MMA) shows the observational result of the random terpolymer by the use of an electron microscope.

The results indicate that the random copolymer does not have such a multi-phase structure as in the present invention.

REFERENCE EXAMPLE 2

Preparation of Blend

The epoxy group-containing ethylene copolymer used in Preparation Example 1 was blended with 30% by weight of polymethyl methacrylate (trade name Acrypet MD; made by Mitsubushi Rayon Co., Ltd.), and they were mixed at 250° C. under melting. The blend was observed through an electron microscope, and the results are shown in Photograph No. 3 (E-GMA/PMMA).

In the blend, a particle size of the dispersed polymethyl methacrylate is great, and therefore the structure of the polymer is noticeably different from the multi-phase structure of the present invention.

REFERENCE EXAMPLE 3

In a high-speed shear mixer, 950 g of ethylene-glycidyl methacrylate copolymer used in Preparation Example 1 was mixed, at ordinary temperature for 5 minutes, with a solution in which 0.5 g of dicumyl peroxide (trade name Percumyl D; made by Nippon Oils & Fats Co., Ltd.) was dissolved in 50 g of methyl methacrylate. The mixture was then extruded at 200° C. by an extruder, and graft reaction was performed in a usual grafting manner in order to obtain a short-chain graft polymer.

The structure of the thus obtained graft polymer can be observed from the electron microscope photograph of Photograph No. 4 (E-GMA-g-MMA). The results in the photograph indicate that the above-mentioned short-chain graft polymer does not have such a multi-phase structure as seen in the polymer prepared in Preparation Example 1, but a single-phase structure.

PREPARATION EXAMPLE 4

Preparation of Multi-phase Structure Thermoplastic Resin IIc

The same procedure as in Preparation Example 1 was repeated with the exception that ethylene-glycidyl methacrylate copolymer as an epoxy group-containing ethylene copolymer was replaced with ethylene-ethyl acrylate copolymer (content of ethyl acrylate=20% by weight) (trade name Rexlon EEA A-4200; made by Nippon Petrochemicals Co., Ltd.), in order to obtain a graft polymerization precursor polymerization degree of styrene=900), and finally a multi-phase structure thermoplastic resin IIc was prepared.

As in Preparation Example 1, the thus prepared multi-phase structure thermoplastic resin was observed through an electron microscope, and it was found that spherical resin particles each having a diameter of 0.3 to 0.4 μm were uniformly dispersed therein.

In this case, the grafting efficiency of the styrene polymer was 78.3%.

PREPARATION EXAMPLE 5

Preparation of Multi-phase Structure Thermoplastic Resin IId

The same procedure as in Preparation Example 4 was repeated with the exception that 300 g of the styrene monomer as a vinyl monomer was replaced with a methyl methacrylate monomer and that 0.6 g of n-dodecylmercaptan as a molecular weight modifier was used, thereby preparing multi-phase structure thermoplastic resin IId.

In this case, the number average polymerization degree of the prepared methyl methacrylate polymer was 700, and the average particle size of the resin particles dispersed in this resin composition was from 0.1 to 0.2 μm.

PREPARATION EXAMPLE 6

The same procedure as in Preparation Example 4 was repeated with the exception that 300 g of styrene as a vinyl monomer was dissolved in 300 g of benzene as a solvent and that 2.5 g of n-dodecylmercaptan was used as a molecular weight modifier, in order to obtain a graft polymerization precursor, and a graft reaction was brought to an end. In this case, the number average polymerization degree of the styrene polymer was 4.1, and the state of the styrene polymer was liquid. This grafted compound was observed by an electron microscope, and it was presumed that the diameter of the dispersed resin particles seemed to be 0.001 μm or less, but this was not confirmed.

EXAMPLES 1 TO 6

Caprolactam ($\eta_{rel}$=3.5 dl/g, which was measured at 1 g/dl of 98% concentrated sulfuric acid at 25° C.) was dry-blended with a predetermined amount of multi-phase structure thermoplastic resin IIa or IIb prepared in Preparation Examples 1 and 2, and they were then melted and kneaded by a plastomill monoaxial extruder (Toyo Seiki Seisaku-sho Ltd.) a temperature of which was set to 280° C.

Afterward, specimens were prepared therefrom by an injection molding machine having a cylinder temperature of 250° C., and the evaluation of physical properties was then made. The results are set forth in Table 1.

Test procedures were as follows:
(1) Tensile strength: ASTM-D638
(2) Izod impact strength (not notched): ASTM D256
(3) Heat distortion temperature: ASTM-D648
(4) Water absorption: Each specimen was immersed into water at 23° C. for 25 days and was then allowed to stand at 23° C. at a relative humidity of 65% for one day, and from an occurred weight change, the water absorption was calculated.
(5) State of layer peeling: An adhesive tape was applied onto the rupture cross-section of a molded article and was then torn away therefrom, and the state on the thus treated position was observed visually. Evaluation was made by ranking the state into the following three classes:

O: Peeling was not present at all.
Δ: Peeling was slightly present.
X: Peeling was present.

TABLE 1

| Example | 1 | 2 | 3 | 4 | 5 | 6 |
|---|---|---|---|---|---|---|
| Polycaprolactam (wt %) | 95 | 90 | 80 | 70 | 90 | 70 |
| Multi-phase Thermoplastic Resin IIa (wt %) | 5 | 10 | 20 | 30 | — | — |
| Multi-phase Thermoplastic Resin IIb (wt %) | — | — | — | — | 10 | 30 |
| Tensile Strength (kg/cm²) | 810 | 800 | 785 | 770 | 795 | 770 |
| Izod Impact Strength (kg · cm/cm) | 72 | 85 | not broken | not broken | 82 | not broken |
| Heat Distortion Temperature (°C.) | 68 | 70 | 69 | 67 | 70 | 69 |
| Water Absorption (%) | 1.9 | 1.5 | 1.3 | 1.2 | 1.4 | 1.2 |
| State of Layer Peeling | O | O | O | O | O | O |

COMPARATIVE EXAMPLES 1 TO 11

The same procedure as in Example 1 was repeated with the exception that the multi-phase structure thermoplastic resins were replaced with ethylene-glycidyl methacrylate-ethyl acrylate copolymer (glycidyl methacrylate content=5% by weight, ethyl acrylate content=10% by weight) (trade name Rexpearl JS 4450; made by Nippon Petrochemicals Co., Ltd.) and the unmodified epoxy group-containing ethylene copolymer used in Preparation Example 1, as well as the blend obtained in Reference Example 2 and the short-chain graft polymer obtained in Reference Example 3. The results are set forth in Table 2.

TABLE 2

| Comp. Example | 1 | 2 | 3 | 4 | 5 | 6 | 7 | 8 | 9 | 10 | 11 |
|---|---|---|---|---|---|---|---|---|---|---|---|
| Polycaprolactam (wt %) | 100 | 90 | 80 | 70 | 90 | 80 | 70 | 80 | 70 | 80 | 70 |
| Ethylene-Glycidyl Methacrylate Copolymer (wt %) | 0 | 10 | 20 | 30 | 0 | 0 | 0 | — | — | — | — |
| Ethylene-Glycidyl Methacrylate-Ethyl Acrylate Copolymer (wt %) | 0 | 0 | 0 | 0 | 10 | 20 | 30 | — | — | — | — |
| Blend* (wt %) | — | — | — | — | — | — | — | 20 | 30 | — | — |
| Short-Chain Graft Polymer (wt %) | — | — | — | — | — | — | — | — | — | 20 | 30 |
| Tensile Strength (kg/cm$^2$) | 770 | 710 | 645 | 550 | 700 | 630 | 530 | 600 | 520 | 635 | 540 |
| Izod Impact Strength (kg · cm/cm) | not broken | not broken | not broken | not broken | not broken | not broken | not broken | 35 | 26 | not broken | not broken |
| Heat Distortion Temperature (°C.) | 68 | 64 | 59 | 52 | 61 | 56 | 50 | 55 | 50 | 55 | 52 |
| Water Absorption (%) | 2.3 | 2.5 | 2.4 | 2.6 | 2.2 | 2.1 | 2.0 | 2.6 | 2.8 | 2.3 | 2.4 |
| State of Layer Peeling | — | ○ | Δ | × | Δ | Δ | × | × | × | Δ | Δ |

*A mixture of 70 wt % of ethylene-glycidyl methacrylate copolymer and 30 wt % of polymethyl methacrylate.

COMPARATIVE EXAMPLES 12 TO 16

The same procedure as in Example 1 was repeated with the exception that amounts of the multi-phase structure thermoplastic resins were altered, in order to prepare specimens, and invenstigations was then made. The results are set forth in Table 3.

TABLE 3

| Comp. Example | 12 | 13 | 14 | 15 | 16 |
|---|---|---|---|---|---|
| Polycaprolactam (wt %) | 99.5 | 35 | 25 | 35 | 25 |
| Multi-phase Thermoplastic Resin IIa (wt %) | 0.5 | 65 | 75 | — | — |
| Multi-phase Thermoplastic Resin IIb (wt %) | — | — | — | 65 | 75 |
| Tensile Strength (kg/cm$^2$) | 805 | 460 | 440 | 455 | 440 |
| Izod Impact Strength (kg · cm/cm) | not broken | not broken | not broken | not broken | not broken |
| Heat Distortion Temperature (°C.) | 67 | <25 | <25 | <25 | <25 |
| Water Absorption (%) | 2.3 | 0.8 | 0.7 | 0.9 | 1.0 |
| State of Layer Peeling | ○ | ○ | ○ | ○ | ○ |

As is apparent from the foregoing, when the amount of the multi-phase thermoplastic resin is in excess of 50% by weight, the compositions lose all the characteristics of polyamide resin, and inversely when the multi-phase thermoplastic resin is used in an amount of less than 1% by weight, its effect is not expected at all.

EXAMPLES 7 AND 8, AND COMPARATIVE EXAMPLES 17 TO 19

The same procedure as in Example 1 was repeated with the exception that the polyamide resin was replaced with polyhexamethylene adipamide resin (which was reprented as PHMAP) (($\eta_{rel}$=2.9 dl/g which was measured at 1 g/dl of 98% concentrated sulfuric acid at 25° C.), and investigations were then made. The results are set forth in Table 4.

TABLE 4

| | Ex. 7 | Ex. 8 | Comp. Ex. 17 | Comp. Ex. 18 | Comp. Ex. 19 |
|---|---|---|---|---|---|
| PHMAP (wt %) | 90 | 80 | 100 | 90 | 40 |
| Multi-phase Thermoplastic Resin IIa (wt %) | 10 | 20 | — | — | 60 |
| Multi-phase Thermoplastic Resin IIb (wt %) | — | — | — | 10 | — |
| Tensile Strength (kg/cm$^2$) | 790 | 805 | 780 | 715 | 490 |
| Izod Impact Strength (kg · cm/cm) | 69 | not broken | not broken | not broken | not broken |
| Heat Distortion Temperature (°C.) | 74 | 72 | 75 | 62 | <25 |
| Water Absorption (%) | 1.4 | 1.2 | 2.6 | 2.4 | 0.9 |
| State of Layer Peeling | ○ | ○ | — | ○ | ○ |

COMPARATIVE EXAMPLE 20

The same procedure as in Example 1 was repeated with the exception that the multi-phase structure thermoplastic resin in Example 1 was replaced with the grafted compound in Preparation Example 3. As a result, tensile strength was 620 kg/cm$^2$; with regard to Izod impact strength, a specimen was not broken, when it was measured; heat distortion temperature was 36° C.; water absorption was 2.2%; and layer peeling was not present.

EXAMPLE 9

First, there were dry-blended 10% by weight of the graft polymerization precursor (diameter of dispersed particles=0.3 to 0.5 μm) obtained in Preparation Example 1, 5% by weight of unmodified epoxy group-containing olefin copolymer used in Preparation Example 1, 5% by weight of styrene polymer (trade name Diarex HF-55; made by Mitsubishi Monsanto Chemical Co.) and 80% by weight of polycaprolactam with one another, followed by extruding at 260° C. In accordance with the same procedure as in Example 1, physical properties were then measured. As a result, tensile strength was 790 kg/cm$^2$; Izod impact strength was 75 kg.cm/cm; heat distortion temperature was 67° C.; water absorption was 1.8%; and layer peeling was not present.

EXAMPLES 10 TO 15

The same procedure as in Example 1 was repeated with the exception that the multi-phase structure thermoplastic resin in Example 1 was replaced with the multi-phase structure thermoplastic resin IIc or IId obtained in Preparation Examples 4 and 5. The results are set forth in Table 5.

TABLE 5

| Example | 10 | 11 | 12 | 13 | 14 | 15 |
|---|---|---|---|---|---|---|
| Polycaprolactam (wt %) | 95 | 90 | 80 | 70 | 90 | 70 |
| Multi-phase Thermoplastic Resin IIc (wt %) | 5 | 10 | 20 | 30 | — | — |
| Multi-phase Thermoplastic Resin IId (wt %) | — | — | — | 10 | 30 |  |
| Tensile Strength (kg/cm$^2$) | 810 | 800 | 785 | 770 | 795 | 770 |
| Izod Impact Strength (kg · cm/cm) | 69 | 81 | not broken | not broken | 77 | not broken |
| Heat Distortion Temperature (°C.) | 68 | 67 | 65 | 64 | 69 | 65 |
| Water Absorption (%) | 1.8 | 1.3 | 1.2 | 1.0 | 1.4 | 1.1 |
| State of Layer Peeling | ○ | ○ | ○ | ○ | ○ | ○ |

COMPARATIVE EXAMPLE 21 TO 24

The same procedure as in Example 1 was repeated with the exception that the multi-phase structure thermoplastic resins were substituted with the unmodified ethylene/ethyl acrylate copolymer (E/EA) used in Preparation Example 4. The results are set forth in Table 6.

TABLE 6

| Comp. Example | 21 | 22 | 23 | 24 |
|---|---|---|---|---|
| Polycaprolactam (wt %) | 100 | 90 | 80 | 70 |
| E/EA Copolymer (wt %) | — | 10 | 20 | 30 |
| Tensile Strength (kg/cm$^2$) | 770 | 710 | 645 | 550 |
| Izod Impact Strength (kg · cm/cm) | not broken | 32 | 25 | 28 |
| Heat Distortion Temperature (°C.) | 68 | 65 | 59 | 52 |
| Water Absorption (%) | 2.3 | 2.3 | 2.4 | 2.5 |
| State of Layer Peeling | — | ○ | × | × |

COMPARATIVE EXAMPLES 25 TO 29

The same procedure as in Example 1 was repeated with the exception that the amount of the multi-phase structure thermoplastic resin was changed, in order to prepare specimens, and investigations were made. The results are set forth in Table 7.

TABLE 7

| Comp. Example | 25 | 26 | 27 | 28 | 29 |
|---|---|---|---|---|---|
| Polycaprolactam (wt %) | 99.5 | 35 | 25 | 35 | 25 |
| Multi-phase Thermoplastic Resin IIc (wt %) | 0.5 | 65 | 75 | — | — |
| Multi-phase Thermoplastic Resin IId (wt %) | — | — | — | 65 | 75 |
| Tensile Strength (kg/cm$^2$) | 780 | 490 | 430 | 485 | 430 |
| Izod Impact Strength (kg · cm/cm) | not broken | not broken | not broken | not broken | not broken |
| Heat Distortion Temperature (°C.) | 68 | <25 | <25 | <25 | <25 |
| Water Absorption (%) | 2.5 | 0.8 | 0.7 | 0.9 | 1.0 |
| State of Layer Peeling | ○ | ○ | ○ | ○ | ○ |

As is apparent from the foregoing, when the multi-phase structure thermoplastic resin is in excess of 50% by weight, its composition loses characteristics of the polyamide resin. Inversely, when the multi-phase structure thermoplastic resin is used in an amount of less than 1% by weight, its effect cannot be obtained.

EXAMPLES 16 AND 17, AND COMPARATIVE EXAMPLES 30 TO 32

The same procedure as in Example 10 was repeated with the exception that the polyamide resin was replaced with polyhexamethylene adipamide resin (which would be shown as PHMAP in the following table)($\eta_{rel}$=2.9 dl/g, which was measured at a concentration of 1 g/dl in 98% concentrated sulfuric acid at 25° C.). The results are set forth in Table 8.

TABLE 8

| | Ex. 16 | Ex. 17 | Comp. Ex. 30 | Comp. Ex. 31 | Comp. Ex. 32 |
|---|---|---|---|---|---|
| PHMAP (wt %) | 90 | 80 | 100 | 90 | 40 |
| Multi-phase Thermoplastic Resin IIc (wt %) | 10 | 20 | — | — | 60 |
| Multi-phase Thermoplastic Resin IId (wt %) | — | — | — | 10 | — |
| Tensile Strength (kg/cm$^2$) | 785 | 790 | 780 | 720 | 470 |
| Izod Impact Strength (kg · cm/cm) | 65 | not broken | not broken | 35 | not broken |
| Heat Distortion Temperature (°C.) | 73 | 69 | 75 | 64 | <25 |
| Water Absorption (%) | 1.3 | 1.0 | 2.6 | 2.3 | 0.8 |
| State of Layer Peeling | ○ | ○ | — | ○ | ○ |

COMPARATIVE EXAMPLE 33

The same procedure as in Example 1 was repeated with the exception that the multi-phase structure thermoplastic resin in Example 10 was replaced with the grafted compound in Preparation Example 6. As a result, tensile strength was 630 kg/cm2; with regard to Izod impact strength, a specimen was not broken, when it was measured; heat distortion temperature was 38° C.; water absorption was 2.4% by weight; and layer peeling was not present.

EXAMPLE 18

First, there were dry-blended 10% by weight of the graft polymerization precursor (diameter of dispersed particles=0.3 to 0.5 μm) obtained in Preparation Example 4, 5% by weight of unmodified ester group-containing α-olfin copolymer used in Preparation Example 4, 5% by weight of styrene polymer (trade name Diarex HF-55; made by Mitsubish Monsanto Chemical Co.)

and 80% by weight of polycaprolactam with one another, followed by extruding at 260° C. In accordance with the same procedure as in Example 1, physical properties were then measured. As a result, tensile strength was 800 kg/cm²; Ixod impact strength was 72 kg.cm/cm; heat distortion temperature was 69° C., water absorption was 1.6% by weight; and layer peeling was not present.

EXAMPLES 19 TO 23

The same procedures as in Example 1 were repeated with the exception that glass fiber and talc were used in ratios in Table 9, in order to prepare specimens, and Izod impact strength and heat distortion temperatures were then measured. The results are set forth in Table 9.

TABLE 9

| Example | 19 | 20 | 21 | 22 | 23 |
|---|---|---|---|---|---|
| Polycaprolactam (wt %) | 90 | 90 | 90 | 90 | 90 |
| Multi-phase Thermoplastic Resin IIa (wt %) | 10 | — | 10 | — | 10 |
| Multi-phase Thermoplastic Resin IIc (wt %) | — | 10 | — | 10 | — |
| Glass Fiber*1, *2 | 25 | 25 | 30 | 30 | 50 |
| Talc*2 | 5 | 10 | 0 | 0 | 0 |
| Izod Impact Strength (kg · cm/cm) | 35 | 30 | 26 | 25 | 20 |
| Heat Distortion Temperature (°C.) | 90 | 98 | 103 | 105 | 145 |

*1 Glass fiber CS-3PE-231 made by Nitto Boseki Co., Ltd.
*2 Parts by weight based on 100 parts by weight of polycaprolactam + multi-phase structure thermoplastic resin.

EXAMPLE 24 TO 28

The same procedure as in Example 5 was repeated with the exception that flame retardants were used in ratios in Table 10, in order to prepare combustion specimens (1/16"×½"×5"). Vertical flame test was carried out in accordance with UL-94 standard. The results are set forth in Table 10.

TABLE 10

| Example | 24 | 25 | 26 | 27 | 28 |
|---|---|---|---|---|---|
| Polycaprolactam (wt %) | 90 | 90 | 90 | 90 | 90 |
| Multi-phase Thermoplastic Resin IIb (wt %) | 10 | 10 | 10 | 10 | 10 |
| Brominated Polystyrene*3 (parts by weight) | 5 | 7 | 30 | — | — |
| Magnesium Hydroxide*4 (parts by weight) | — | — | — | 40 | 100 |
| Antimony Trioxide (parts by weight) | 2 | 2 | 12 | — | — |
| UL-94 Combustibility | V-1 | V-0 | V-0 | V-2 | V-0 |

*3 ⁻(CH₂—CH)ₙ⁻ (n = 50)

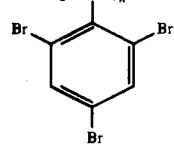

*4 An average particle diamter was 5 μm.

In the thermoplastic resin composition of the present invention, heat resistance can be kept up, and impact strength and hydgroscopicity can be improved. Moreover, the present invention has the feature that the desired composition can be easily manufactured only by mixing raw materials under melting. In view of the features, the thermoplastic resin composition of the present invention can be widely used as materials for, e.g., automobile parts, domestic appliance parts and heat-resistant containers.

What is claimed is:

1. A thermoplastic resin composition which comprises:
   (I) 50–99% by weight of a polyamide resin, and
   (II) 50–1% by weight of a multi-phase structure thermoplastic resin formed by melting a mixture which comprises 1 to 100% by weight of a graft polymerization precursor (A) obtained by copolymerizing at least one vinyl monomer with at least one radical polymerizable or copolymerizable organic peroxide represented by the following general formula (a) and (b)

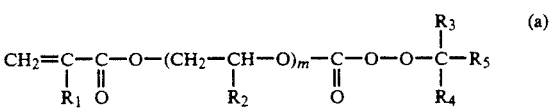

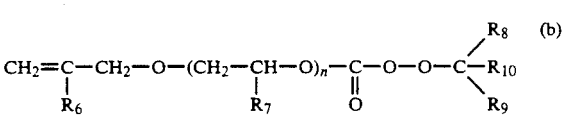

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$, and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2, in particles of at least one ethylene copolymer selected from the group consisting of epoxy group-containing ethylene copolymers, ethylene-unsaturated carboxylic acid copolymers, ethylene-unsaturated carboxylic acid alkyl ester copolymers and metal salts of said unsaturated carboxylic acid copolymers.

2. A thermoplastic resin composition according to claim 1 wherein said ethylene copolymer is an epoxy group-containing ethylene copolymer which is composed of 60 to 99.5% by weight of ethylene, 40 to 0.5% by weight of glycidyl acrylate or methacrylate, and 0 to 39.5% by weight of another unsaturated monomer.

3. A thermoplastic resin composition according to claim 1 wherein said ethylene copolymer is a copolymer or its metallic salt which is composed of 50 to 99.5% by weight of ethylene, 50 to 0.5% by weight of at least one monomer selected from the group consisting of unsaturated carboxylic acids, alkyl esters thereof, and 0 to 49.5% by weight of another unsaturated monomer.

4. A thermoplastic resin composition according to claim 1 wherein said vinyl monomer is a vinyl aromatic monomer.

* * * * *